(12) United States Patent
Paxton

(10) Patent No.: US 6,487,870 B2
(45) Date of Patent: Dec. 3, 2002

(54) TRANSITION SUPPORT FOR EVAPORATIVE COOLER

(75) Inventor: Donald Ian Paxton, Tea Tree Gully (AU)

(73) Assignee: FF Seeley Nominees Pty LTD (AU)

( * ) Notice: Subject to any disclaimer, the term of this patent is extended or adjusted under 35 U.S.C. 154(b) by 0 days.

(21) Appl. No.: 09/781,761

(22) Filed: Feb. 12, 2001

(65) Prior Publication Data

US 2001/0040201 A1 Nov. 15, 2001

(30) Foreign Application Priority Data

Dec. 13, 1999 (AU) ........................................ 72141/4584
Feb. 11, 2000 (AU) ................................................ 5546/00

(51) Int. Cl.$^7$ ............................................. F25D 23/12
(52) U.S. Cl. .................. 62/259.1; 62/259.4; 62/DIG. 16
(58) Field of Search ................................ 62/304, 259.1, 62/259.4, 297, DIG. 16; 248/237, 188.2; 182/45

(56) References Cited

U.S. PATENT DOCUMENTS

| 3,603,547 A | | 9/1971 | Hills | |
| 4,369,148 A | * | 1/1983 | Hawkins | 62/310 X |
| D298,276 S | | 10/1988 | Butcher | |
| 4,819,448 A | | 4/1989 | Campbell et al. | |
| 4,895,066 A | * | 1/1990 | Carnahan | 62/259.1 X |
| D342,780 S | | 12/1993 | Pendergrast et al. | |
| 5,454,538 A | * | 10/1995 | Merideth | 248/237 |
| 6,047,935 A | | 4/2000 | Wright | |
| 6,338,461 B1 | * | 1/2002 | Wallace et al. | 248/237 |

* cited by examiner

Primary Examiner—Chen-Wen Jiang
(74) Attorney, Agent, or Firm—Watts, Hoffman, Fisher & Heinke Co., L.P.A.

(57) ABSTRACT

A support structure for the support of evaporative air cooler consisting of a mounting transition between the evaporative cooler and the ductwork of the installation. The mounting transition includes a means of fixing the evaporative air cooler to the transition without the use of fasteners, support and concealment of telescopic corner supports and support of an anti draft shutter assembly. The mounting transition also provides for the transitioning of air flow from a circular fan discharge to a square duct, and serves as a transportation pallet which can also be used as an installation aid.

5 Claims, 5 Drawing Sheets

TRANSITION SUPPORT FOR EVAPORATIVE COOLER

FIELD OF INVENTION

The present invention relates to the support for transportation, installation, support after installation and structural integrity of fixed evaporative air coolers.

DESCRIPTION OF THE PRIOR ART

Evaporative air coolers are used to cool domestic and industrial premises. These coolers are normally mounted on the roof of the premises directly connected to the ductwork used to convey the air from the cooler to an air distribution system within the ceiling space under the roof of the building. The cooler must therefore generally have sufficient structural integrity to support its own weight under all weather conditions and for very long periods of time. Such structural integrity is usually incorporated in the structural design of the cooler components, in particular, the base of the cooler.

A further requirement for evaporative coolers, particularly those fitted with an axial flow fan, is to provide an airflow transition between the circular shape at the discharge of the fan and the generally square shape of the ductwork to which the airflow of the cooler is to be transmitted. This transition is generally provided by a separate transition piece between the fan discharge and the connection to the ductwork.

During the manufacture, storage, transportation and installation of evaporative coolers, it is necessary to provide additional support and strength to the cooler to withstand the rigors of movement and external impacts. This support is generally provided by mounting the cooler on a disposable shipping pallet during the manufacturing process, which is subsequently discarded once the cooler is installed at the customers' premises. The shipping pallet must provide for access and pickup by a conventional forklift in addition to its cooler support function. The shipping pallet is generally manufactured from timber or other low cost materials, but still presents a cost that does not form part of the ultimate value of the cooler. In addition, timber pallets are often broken in transport resulting in further losses as damage to the cooler.

Traditionally, all of these requirements are met by incorporating in the cooler a base of sufficient structural integrity to support the cooler, a transition piece to match the fan outlet and ductwork connection shapes, and a low cost pallet for transportation and handling.

Other solutions to this problem in the market place utilise a plastic moulded pallet to support the cooler, which also contributes to the structural integrity of the cooler base. The pallet is left attached as a permanent part of the cooler after its installation. However, this results in an objectionable appearance to the final installation since the projections necessary to allow forklift access are left starkly visible underneath the cooler. Alternatively, the installer is required to physically remove the projections requiring additional effort and still with a compromise as to appearance.

During installation of the cooler, the installer is often faced with the problem of manoeuvring the entire cooler to a level orientation single-handed. It is essential the cooler be set level at installation for correct operation. This can be a difficult operation when the entire weight of the cooler has to be supported and orientated while fitting the fasteners to the discharge ducting through the roof.

Fixing of the cooler to the ducting presents further problems to the installer. Generally, fasteners are applied directly through the cooler base or an extension thereof to the ducting. This invariably requires the installer to access a small and difficult space beneath the cooler, and the physically difficult task of driving the fasteners through to the duct. Generally, this would necessitate two persons to remain with the cooler during the fitting of fasteners, whereas the task of fixing the cooler would be immediately completed if it could be fitted in its final position without the need for fasteners.

In some localities, particularly the USA, there are local requirements that the cooler be supported on the roof independently of the discharge ducting. In practise, this requires the fitment of support legs at the corners of the cooler. Such support legs must have sufficient strength and rigidity to support the cooler under all operating conditions. There are many methods of fitting and holding the support legs in the prior art, including our Australian patent application no. 23501/97 and its U.S. counterpart U.S. Pat. No. 6,047,935 for a telescoping leg, which is contained within the corner post of the cooler. The telescoping leg has the added advantage of being infinitely adjustable for all roof slopes and can easily be set to provide a pre-load of support to the cooler in the set position, thereby ensuring that all load is relieved from the ducting. However; from the perspective of an attractive appearance to the cooler once installed, it is necessary to hide all of a telescoping leg other than that portion which is directly supporting the cooler.

Our previous Australian provisional application no. PQ 4584 describes a weatherseal mechanism fitted to the discharge of an axial fan cooler with unique features including the complete absence of protrusions in the airstream to disturb the flow of air. As described in that application, the weatherseal mechanism is supported and hinged within the support structure described in this application. Such a mechanism is only possible with a support structure that becomes a part of the cooler once it is installed, and is an integral part of the cooler structure.

The present invention addresses all of these problems in the design of the features built into transition support mechanism of the cooler.

SUMMARY OF THE INVENTION

A support structure for the support of evaporative air cooler consisting of a mounting transition, a means of fixing said evaporative air cooler to said transition without the use of fasteners, a means of supporting and concealing telescopic corner supports, a means of supporting an anti draft shutter assembly, a means of transitioning air flow from a circular fan discharge to a square duct, and a transportation pallet which also serves as an installation aid.

DESCRIPTION OF THE DRAWINGS

The invention will be described by reference to the attached drawings, as follows, FIG. 2 shows the transition support in its transportation orientation, and inverted in its installed position as a support for the cooler.

In FIG. 1, the components of an evaporative air cooler are shown in exploded form, as it would be mounted on the ductwork 20. The cooler consists of a base 1, corner posts 3 supporting a roof 2, a fan assembly consisting of a fan 10, a motor 5 and venturi 15. Evaporative pads 4 are fitted to all four sides of the cooler. Generally, the base 1 is designed to provide all the strength and rigidity to support the weight of the cooler throughout its life. The present invention allows the base 1 to be designed as a simple component required to only fulfil the functions of containment of water and sealing of air from the inside to the outside of the cooler. All structural support and strength is provided by the transition support 17, the subject of the present invention.

Figure 5:
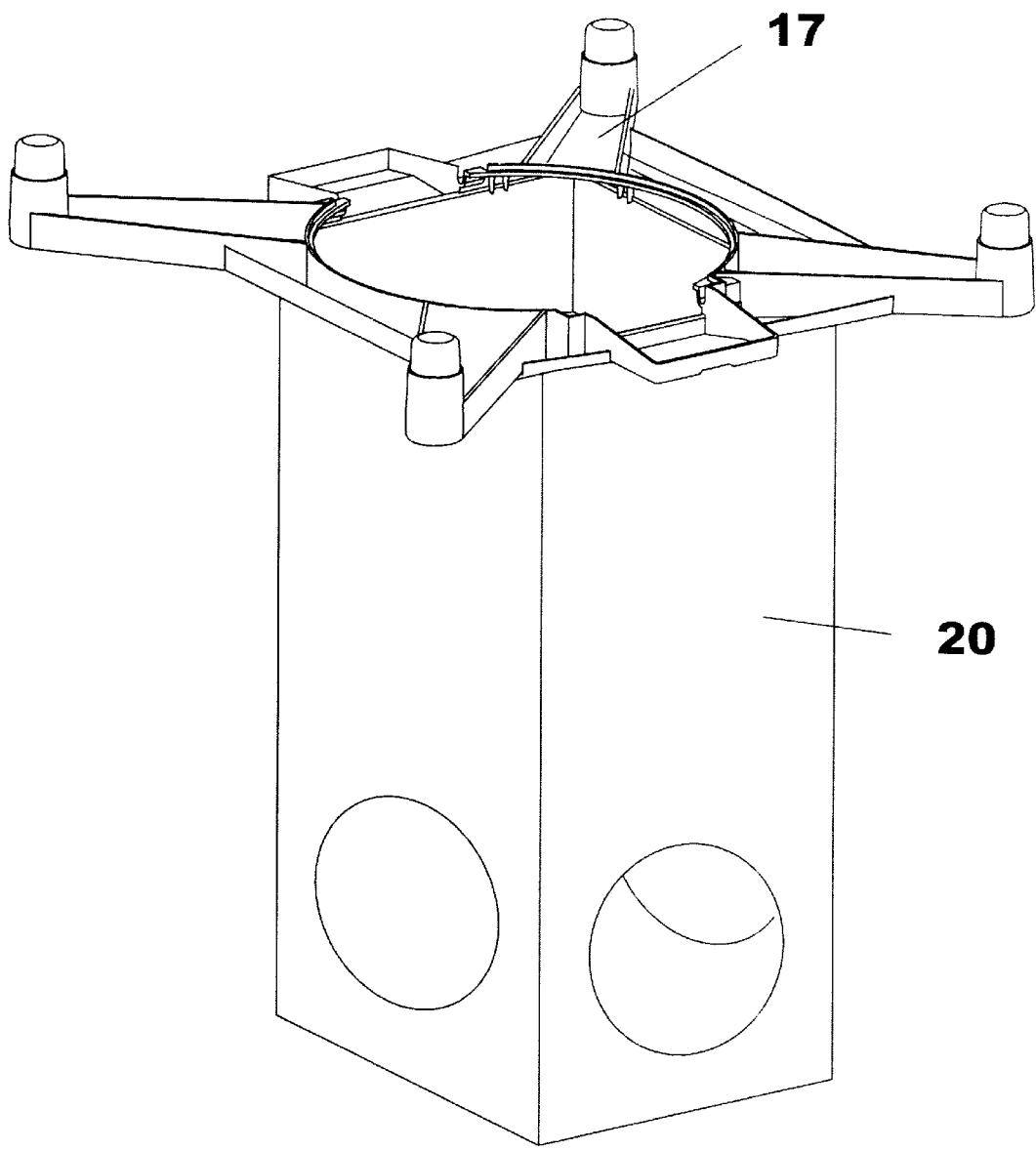
FIG. 5 shows the fitment of the transition support to the discharge duct.

When on the roof, the installer removes the transition support from the cooler, inverts it, and fits it level to the discharge duct 20 as shown in FIG. 5. After inversion, the projecting corner feet 18 that previously served to provide an opening for forklifting now provide an accurate location for positioning of the evaporative cooler as shown in the cut-away section 21 in FIG. 2. Once the cooler is fitted, the projections 18 are hidden from view and only clean lines are visible from outside the cooler as in FIG. 2.

Figure 1:
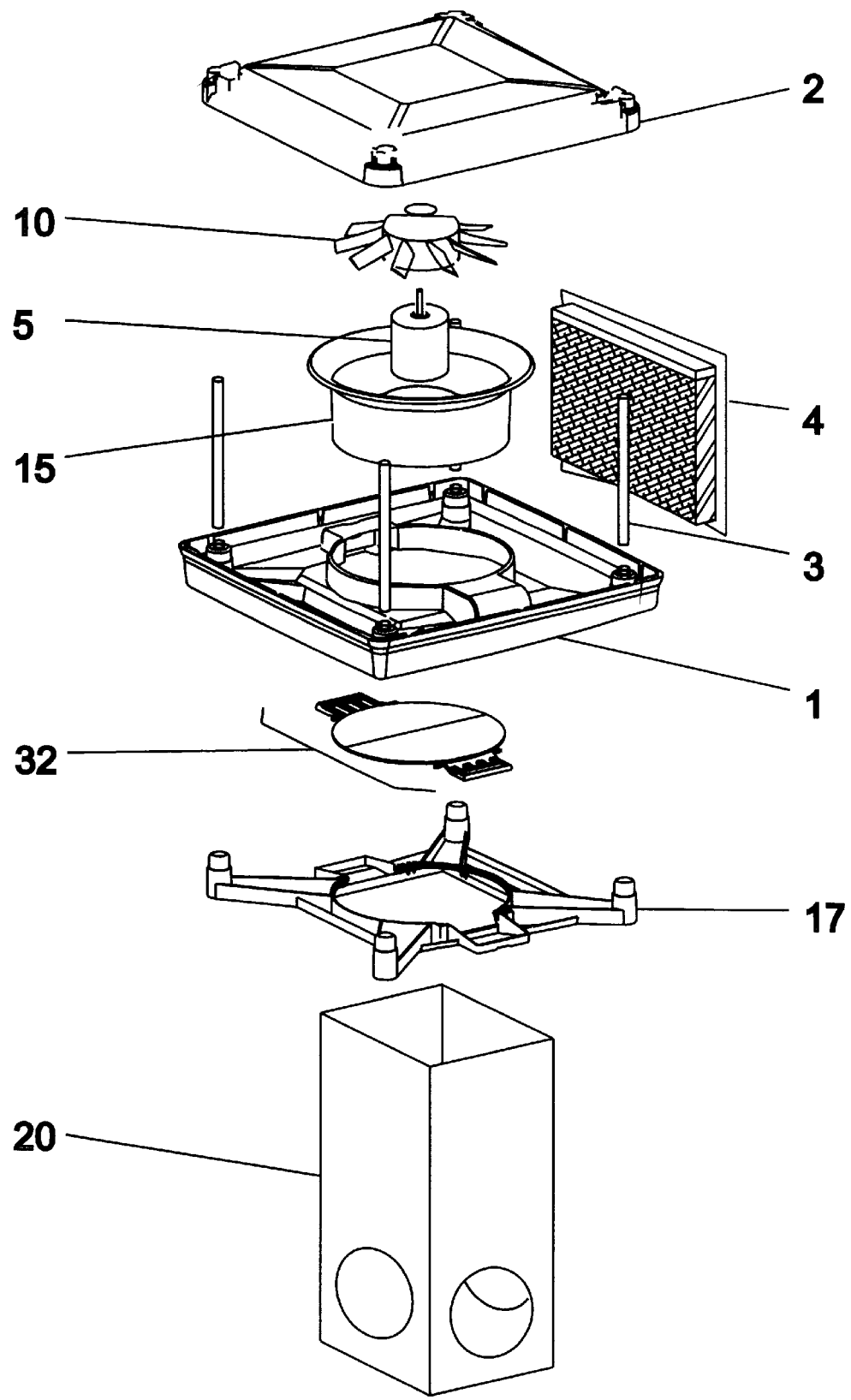
FIG. 1 shows an exploded view of the evaporative cooler and associated ductwork with the transition support component exploded away from cooler base between the fan and ductwork
Figure 2A:
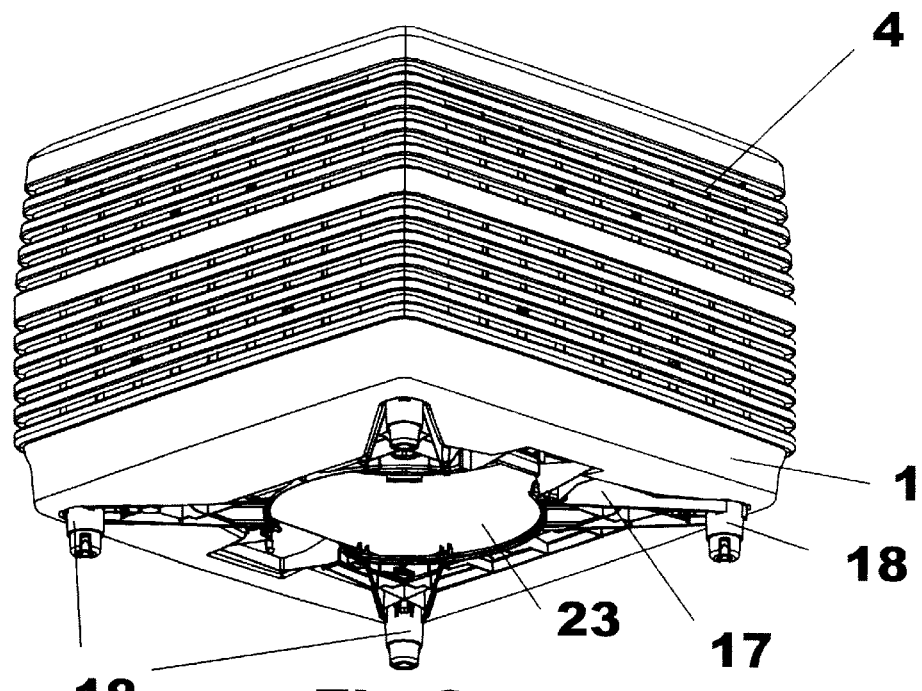
In FIGS. 2a and 2b, the transition support 17 is shown in each of its orientations. When used as a transportation pallet, the transition support 17 is orientated with the corner projections 18 pointing down, away from the base, as shown in FIG. 2a. This orientation provides the open space under the transition support necessary for access by a forklift. The transition support would normally be fitted in this orientation during manufacture of the cooler, and would stay fitted in this way until the cooler is on the customers' roof.
Figure 2B:
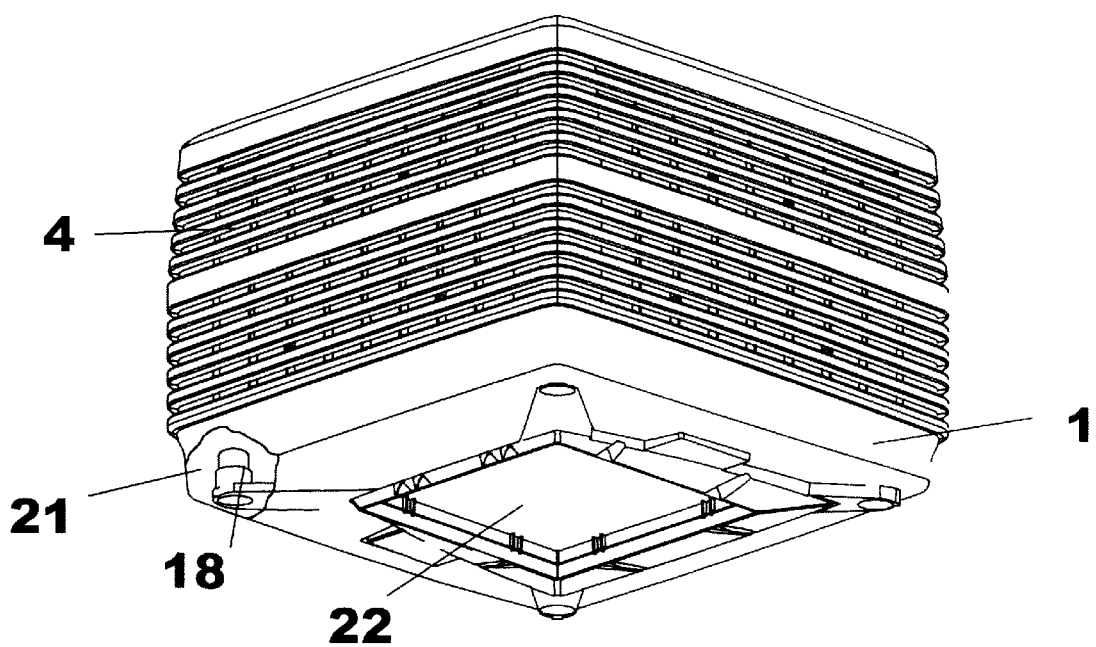

FIG. 2 also illustrates the transition function of the support transition 17. In FIG. 2a, the circular opening 23 is visible from underneath the cooler when the transition support 17 is fitted in the manufacture and transportation orientation. When fitted in the operational orientation, the square opening 22 which fits to the ductwork 20 is visible, while the circular opening 23 abuts the circular exit of the fan venturi 15 (not shown).

When removed from the cooler, the transition support is lightweight and easily handled, ands can be readily fitted and fastened to the discharge duct 20 by one person. Once the transition support 17 is fastened to the discharge duct 20, the cooler is simply lifted into position on the transition support 17, and held in position by the clips (not shown), thereby requiring no additional fasteners.

Figure 3:
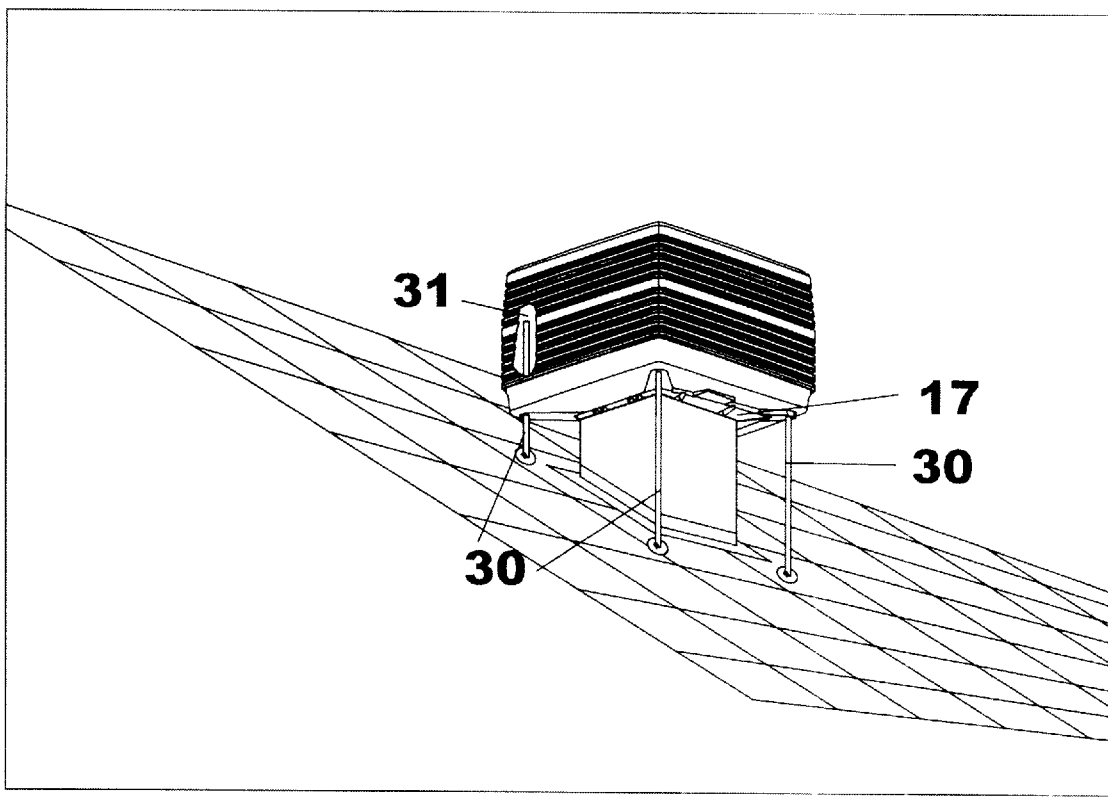
FIG. 3 shows the inclusion of telescoping legs at the corners of the cooler.

FIG. 3 illustrates an alternative embodiment in which the telescoping legs 30 required in some locations are fitted to the transition support 17. When fitted to the transition support 17, the telescoping section not required for direct support of the cooler is concealed within the corner posts of tansition support and within the corners of the cooler, thereby retaining the attractive appearance of the cooler. This is illustrated in the cut-away 31.

Figure 4:
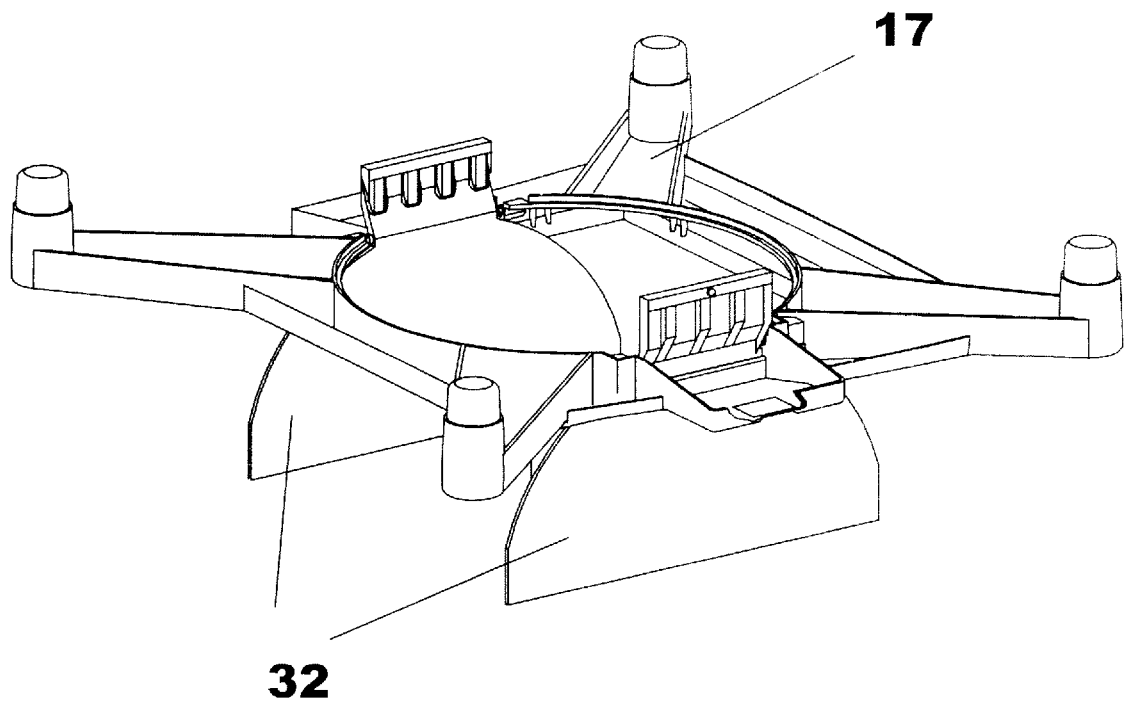
FIG. 4 shows the fitment of the anti-draft mechanism to the transition support.

FIG. 4 shows the fitment of the anti-draft flaps 32 to the transition support 17. This mechanism is described fully in our Australian provisional application no. PQ 4584. Fitment of the anti-draft flaps 32 to the transition support 17 retains the support of all mechanical components associated with the base within the transition support, which has good structural rigidity and integrity. This arrangement also allows the antidraft flaps 32 to be fitted and tested prior to attachment of the evaporative cooler.

The application of the present invention to the cooler design provides an inexpensive and effective solution to the problem of transportation of the cooler, while providing for a lower overall production cost. The problems of mounting the cooler on the mounting duct are greatly relieved by the features in the present invention, allowing the installer to accurately and easily fit the cooler to the building.

We claim:

1. A cooling system comprising:
   a. an air cooler including a housing having a base;
   b. a transition fitting removably connected to the housing adjacent the base;
   c. the housing and fitting having coacting elements effecting the removable connection;
   d. the fitting including a plurality of feet projecting from a base surface of fitting and sized to maintain the system in space relationship with a floor whereby to enable insertion of lift forks under the system for transport of the system;
   e. the base surface including further elements for coacting with the housing elements to secure the fitting to the housing in an operating condition wherein the base and the base surface are adjacent one another; and,
   f. the cooler further including spaces for receiving the feet when the system is in the operating condition.

2. The system of claim 1 further including a through air conditioning passage for alignment with a cooler air outlet when the system is in its operating condition.

3. The system of claim 2 wherein the passage is defined by walls of circular cross section at the base surface and rectangular cross section in an opposed surface.

4. The system of claim 3 wherein the fitting is adapted to be connected to a duct when the system is in the operating condition.

5. The system of claim 1 wherein the fitting is adapted to be connected to a duct when the system is in the operating condition.

* * * * *